(12) United States Patent
Newmark

(10) Patent No.: US 7,938,319 B2
(45) Date of Patent: May 10, 2011

(54) TRADESMANS CARD SYSTEM

(76) Inventor: Steve Newmark, Florham Park, NJ (US)

( * ) Notice: Subject to any disclaimer, the term of this patent is extended or adjusted under 35 U.S.C. 154(b) by 286 days.

(21) Appl. No.: 11/983,830

(22) Filed: Nov. 13, 2007

(65) Prior Publication Data

US 2009/0121015 A1    May 14, 2009

(51) Int. Cl.
*G06K 5/00* (2006.01)
*G06Q 30/00* (2006.01)
*G06Q 40/00* (2006.01)

(52) U.S. Cl. ............... 235/380; 705/14.1; 705/14.17; 705/14.37; 705/14.38; 705/38

(58) Field of Classification Search .......... 235/380; 705/35, 37–38, 14.1, 14.17, 14.37, 14.38
See application file for complete search history.

(56) References Cited

U.S. PATENT DOCUMENTS

| | | | | |
|---|---|---|---|---|
| 5,875,435 | A | 2/1999 | Brown | 705/30 |
| 5,878,141 | A | 3/1999 | Daly et al. | 705/78 |
| 6,224,109 | B1* | 5/2001 | Yang | 283/77 |
| 6,742,704 | B2* | 6/2004 | Fitzmaurice et al. | 235/380 |
| 7,086,590 | B2 | 8/2006 | Yamagami et al. | 235/383 |
| 2002/0035520 | A1 | 3/2002 | Weiss | 705/27 |
| 2003/0093322 | A1 | 5/2003 | Sciuk | 705/26 |
| 2003/0236753 | A1 | 12/2003 | Ljungqvist | 705/64 |
| 2004/0054581 | A1* | 3/2004 | Redford et al. | 705/14 |
| 2004/0158532 | A1 | 8/2004 | Breck et al. | 705/74 |
| 2005/0144100 | A1 | 6/2005 | Shapiro et al. | 705/35 |
| 2005/0197954 | A1 | 9/2005 | Maitland et al. | 705/39 |
| 2005/0251448 | A1 | 11/2005 | Gropper | 705/14 |
| 2005/0267776 | A1 | 12/2005 | Selby et al. | 705/1 |
| 2006/0053132 | A1 | 3/2006 | Litzow et al. | 707/101 |
| 2006/0271391 | A1* | 11/2006 | Lee | 705/1 |
| 2007/0038563 | A1 | 2/2007 | Ryzerski | 705/40 |
| 2007/0208671 | A1* | 9/2007 | Brown et al. | 705/65 |
| 2008/0301020 | A1* | 12/2008 | Varakantam | 705/35 |

OTHER PUBLICATIONS

"The Home Depot Business ToolBox: Index," https://www.hdbusinesstoolbox.com/default.aspx.

* cited by examiner

*Primary Examiner* — Michael G Lee
*Assistant Examiner* — Laura Gudorf
(74) *Attorney, Agent, or Firm* — Ernest D. Buff; Ernest D. Buff & Associates, LLC.; Harry Anagnostopoulos

(57) ABSTRACT

A Tradesman's Card system issues a Tradesman's Card to qualifying tradesman selected from the group consisting of plumbers, electricians, carpenters, masons, mechanics, repair shop professionals, contractors, or related construction or trade companies and professions upon payment of an initiation fee and payment of periodic maintenance fees. The card is issued by a bank or a credit card issuing authority that has contracted with pre-selected wholesalers, jobbers and businesses to provide pre-negotiated discount levels for tradesmen within the group. The tradesman's Card has unique identification features, which identify the card holder as a professional tradesman that is entitled to pre-negotiated discounts. A number visible on the Tradesman's card serves as the system identification number and a credit card number. Professional purchases by the tradesman are tracked by the system, analyzed and reported to sponsoring manufacturers of goods, jobbers or wholesalers for a fee. The purchasing information can be used by merchants for marketing purposes and generation of special discounts on future purchases by the tradesmen.

6 Claims, 1 Drawing Sheet

TRADESMANS CARD SYSTEM

BACKGROUND OF THE INVENTION

1. Field of the Invention

The present invention relates to credit card systems; and, more particularly, to a tradesman's card system issued by a bank or card issuing authority that is capable of providing unique services for a tradesman in connection with the purchase of professional goods or services from a wholesaler or jobber that recognizes the tradesman as a certified and or qualified buyer and member of a particular field.

2. Description of the Prior Art

Many patents address issues related to financial accounting systems and credit card methods and payment options. These prior art disclosures focus on computer systems that monitor payment behavior or provide payment options or use of secondary codes for using credit card transactions in an unsecured network. None of these patents discloses a credit card that is specifically designed for a tradesman that purchases a large amount of trade specific supplies; none of them recognizes the tradesman as a member of a unique profession and provides a special discount or incentives in connection with the purchase.

U.S. Pat. No. 5,875,435 to Brown discloses an automated accounting system. This is an automated accounting system for an entity, such as an individual or business. This system merely posts a particular business transaction under proper accounting codes and generates accounting reports. This system does not issue a tradesman's credit card that is specific to a tradesman selected from a group consisting of plumbers, electricians, carpenters, masons, mechanics, repair shop professionals, contractors, or related construction or trade companies, and professionals such as a doctor in a hospital supply retailer or a attorney in a stationary supply house or the like that provide unique discounts.

U.S. Pat. No. 5,878,141 to Daly et al. discloses a computerized purchasing system and method for mediating purchase transactions over an interactive network. This system has a list comprising a number of payment methods available for the purchaser, including cash, check, Discover, Visa, master Card, and American Express card and a second list comprising the merchant payment acceptance options of different payment methods. This purchasing system compares these two lists to find a matching payment option and presents all potential payment options to the purchaser for selection and purchase processing. The purchaser is not indicated to be a tradesman selected from a group consisting of plumbers, electricians, carpenters, masons, mechanics, repair shop professionals, contractors, or related construction or trade companies and professionals. Also, this system does not offer pre-negofiated discounts to a tradesman purchaser.

U.S. Pat. No. 7,086,590 to Yamagami et al discloses a pay-by-card method and pay-by-card system for home delivery service. A customer orders merchandise on the Internet at a seller web site, after which a pre-arranged delivery service picks up the merchandise and delivers it to the door of the customer. The customer presents a credit card to the delivery person who processes the credit card payment in a portable device. No requirement exists that the consumer be a tradesman selected from a group consisting of plumbers, electricians, carpenters, masons, mechanics, repair shop professionals, contractors, or related construction or trade companies and professions. The system disclosed by the '590 patent does not offer pre-negotiated discounts to a tradesman purchaser. In addition, the seller is not a wholesaler or a jobber.

U.S. Patent Application No. 2002/0035520 to Weiss discloses a property rating and ranking system and method. This is an automated system that assesses the existing property of a borrower and evaluates existing loans to set the amount of unsecured debt available in a credit card. The borrower is not indicated to be a tradesman selected from a group consisting of plumbers, electricians, carpenters, masons, mechanics, repair shop professionals, contractors, or related construction or trade companies and professions. Also, this system does not offer pre-negotiated discounts to a tradesman purchaser.

U.S. Patent Application 2003/0093322 to Sciuk discloses an automated system and method for managing a process for the shopping and selection of human entities. This system and method is for automatically managing a multi-step process in which human providers are selected for some purpose. Typical applications include the selection process associated with employment and dating services. The automated system creates matches between purchasers and providers based on the requirements of the purchaser and declared capabilities of the provider, and these criteria may be verified through a filtration process and/or interview and engagement process. This disclosure does not contemplate a tradesman card with credit capability that provides pre-negotiated discounts to a tradesman during purchase of merchandise.

U.S. Patent Application 2003/0236753 to Ljungqvist discloses a method of safe mediation of payment in connection with network commerce. The payment for purchase of a product from a supplier by a customer is negotiated through an independent party that communicates with a commercial establishment that is affiliated with the customer. When the appropriate communication is received, the supplier is assured that payment will be made immediately or at a later time and extends credit to the customer for the purchase of a product. This '753 patent disclosure does not disclose a method for effecting purchases by a tradesman selected from a group consisting of plumbers, electricians, carpenters, masons, mechanics, repair shop professionals, contractors, or related construction or trade companies and professions offering a pre-negotiated discount on trade merchandise acquired by a tradesman purchaser.

U.S. Patent Application 2004/0158532 to Breck et al. discloses a system for facilitating a transaction. The system provides the card holder with a second identification which when used in combination with a credit card provides instant authorization of a credit card purchase through unsecured networks. Since the secondary identification number is provided by the card provider and is approved by the card user, for all practical purposes, knowledge of the second identification number instantly accesses the credit card. However, the '532 disclosure states that the second identification number is not usable in itself but immediate credit purchase is authorized only by communicating the second identification number even through an unsecured network. This '532 disclosure does not contemplate purchases by a tradesman from a group consisting of plumbers, electricians, carpenters, masons, mechanics, repair shop professionals, contractors, or related construction or trade companies and professions Neither does the '532 disclosure contemplate pre-negotiated discounts to a tradesman purchaser.

U.S. Patent Application 2005/0144100 to Shapiro et al. discloses payment systems and methods for earning incentives using at least two financial instruments. This system uses two borrowing sources a first standard principal borrowing source with no incentives offered, and a second borrowing source which provides borrowing incentives. The first party paying a second party borrows funds of a first amount from the second incentive source, collecting the incentive. Next, the first amount is borrowed from the first standard principal source and the borrowed money is used to pay off the debt of the second incentive borrowing source. This system provides an incentive for the first party by manipulating funds between two borrowing sources. It does not provide a discount offered by a wholesaler or jobber to a tradesman.

U.S. Patent Application 2005/0197954 to Maitland et al. discloses methods and systems for predicting business behavior from profiling consumer card transactions. This system and method provides for predicting small business behavior by analysis of consumer payment card transaction data to determine if a consumer credit card is used for small business purchases. This system merely accumulates data on the use of a consumer credit card and analyzes the data for credit card usage behavior that matches the behavior of a small business. This information is needed for the credit card issuing authority to solicit new business services from the small business that routinely uses a consumer credit card for business purchases. This '954 disclosure does not disclose purchases by a tradesman from a group consisting of plumbers, electricians, carpenters, masons, mechanics, repair shop professionals, contractors, or related construction or trade companies and professions.

U.S. Patent Application 2005/0251448 to Gropper discloses a business card and contact management system. This system is activated by a special card that carries a universal contact locator. The remote server collects contact information, advertisement and news specific to the user with the special card and transfers this information from the remote server to the client computer. A special downloaded program in the client computer displays the contact list, advertisement information and news information. This '448 application disclosure does not suggest a tradesman card usable by professionals consisting of plumbers, electricians, carpenters, masons, mechanics, repair shop professionals, contractors, or related construction or trade companies or professionals for purchasing merchandise. This system does not offer pre-negotiated discounts to a tradesman purchaser.

U.S. Patent Application 2005/0267776 to Selby et al. discloses a combo kit and method of providing a combo kit. This combo kit selection system and methods are operable to facilitate the configuration and purchase of a power tool combination kit. This is a combo kit with a battery, battery charger and a number of power tools selected by the customer. This '776 disclosure does not suggest a tradesman card used for purchases by a tradesman from a group consisting of plumbers, electricians, carpenters, masons, mechanics, repair shop professionals, contractors, or related construction or trade companies or professionals.

U.S. Patent Application 2006/0053132 to Litzow et al. discloses a system and method for dynamic price setting and facilitation of commercial transactions. This system collects customer data of purchases, customer payment preferences and vendor data including type of bundles and prices. This collection of data is analyzed to extract demographic group profiles and provides means to optimize offerings to individual groups of customers. This data collection system is not a tradesman card that provides a discount for professional purchases of tradesman from a group consisting of plumbers, electricians, carpenters, masons, mechanics, repair shop professionals, contractors, or related construction, trade companies or professionals.

U.S. Patent Application 2007/0038563 to Ryzerski discloses systems and methods for managing buildings and finances. A stand-alone computer system keeps track of consumables in a building such as use of oil, propane, water, electric, food, and the like. This system does not contemplate use of a Tradesman card system; it does not provide pre-negotiated discounts at pre-selected wholesalers or jobbers for purchases made by a tradesman.

Foreign Patent Application Publication JP2001229264 to Kabamoto discloses a credit/certification business system by a smart card, and a smart card used for the same. A smart card evaluates the credit limit as the smart credit card is used for purchases. The customer is provided with a new, modified credit limit as purchases and payments are made. This business system does not contemplate use of a Tradesman card.

Foreign Patent Application Publication WO200167318 to Sanda discloses a settlement method and settlement system. A data center has a database that includes a customer's credit card number and a mobile phone number in a correlated manner. The data center is registered with an authorization service network for credit card purchases and includes a number of goods/service shops. When a customer makes a purchase, the customer transmits the card settlement information to the data center using the mobile phone. The data center contacts a credit card company and the purchase is authorized without using a credit card. This business system disclosed by the '318 patent application does not suggest a Tradesman card system.

Non-Patent Publication entitled ""The Home Depot Business ToolBox: Index" at https://www.hdbusinesstoolbox-.com/default.aspx discloses a Home Depot Business Tool-Box, which comprises Health Insurance and Benefits, Wireless Telecommunications, Business Insurance, Payroll Processing, Computers and Technology, Shipping, Printing and Copying, Dumpster Rentals, Logo Wear and Apparel, Business Mgmt Software, Temporary Storage Solutions and Credit Card Processing. This Home Depot Business ToolBox provides businesses with time saving management tools and significant savings on many business services that are in use everyday. This business service does not issue a Tradesman Card to tradesman selected from a group consisting of plumbers, electricians, carpenters, masons, mechanics, repair shop professionals, contractors, or related construction or trade companies. Moreover, the business service disclosed by the Home Depot Business ToolBox Publication does not contemplate pre-negotiated discounts for merchandise purchased by a tradesman at pre-selected wholesaler or jobber locations.

There remains a need in the art for a tradesman card that recognizes a tradesman as a part of specialized group of professionals consisting of plumbers, electricians, carpenters, masons, mechanics, repair shop professionals, contractors, or related construction, trade companies and professions that purchase a large volume of trade supplies from wholesalers and use specialized services of jobbers deserving specialized treatment, including discounts. There additionally exists a need for a tradesman's card system wherein wholesalers and manufacturers offer revised discount levels or provide additional discounts for tradesmen purchases based on volume, brand and the like.

SUMMARY OF THE INVENTION

The present invention provides a Tradesman's Card issued by a bank or card issuing authority appointed for distribution solely to trade professionals selected from the group consisting of plumbers, electricians, carpenters, masons, mechanics, repair shop professionals, contractors, related construction or trade companies and or professions. The Tradesman's Card is used for purchases made at professional trade companies, including wholesalers or jobbers. It is capable of providing a unique service for a tradesman, including pre-negotiated discounts on tradesman purchases at pre-selected wholesaler or jobber locations, according to negotiations set forth by the bank or card issuing authority. In addition, the bank or credit card issuing authority of the Tradesman's card has sponsorship relationship with manufacturers of goods, wholesalers and jobbers to provide a feedback regarding tradesman trade supply purchases. This feedback information may be tracked by the bank or card issuing authority. Aggregate information concerning the tradesman purchasing preferences can then be sold to these sponsorship entities. This information is extremely valuable to manufacturers of goods, wholesalers and jobbers, since they form part of the business strategies of these sponsoring entities. Manufacturers, wholesalers or jobbers can use this information to establish additional incentives such as targeted discounts and the like, to entice the tradesman to use specific merchandise or service.

When a tradesman subscribes to a Tradesman's Card System, an initiation fee is paid and the tradesman is issued a Tradesman's Card that has a unique identification number, which also serves as a credit card number. The tradesman needs to sign an agreement that authorizes the bank or credit card issuing authority to divulge or disclose the purchases made by the tradesman to a third party. This permits the bank or card issuing authority to disclose the purchase patterns of a tradesman of a particular trade in an agglomerated or detailed format to manufacturers of goods, wholesalers and the like. By this mechanism, the cardholder agreement authorizes release of purchasing information. Manufactures wishing to increase their business through acquisition of new customers can procure this valuable information for an agreed upon consideration. Wholesalers and distributors can thereby increase their business with new customers without having to finance the additional accounts receivables. The Tradesman's Card has the initiation date of the membership set forth on the front face of the card. For example, a tradesman is indicated to have been a member since xx/xxxx on the front face of the Tradesman's Card. The tradesman cardholder must make periodic payments to maintain his status as a member of the Tradesman's Card service. Card status for the tradesman cardholder is stored within the Tradesman's Card System and is verified each time the credit card is used for a purchase. The front face of the Tradesman's Card indicates: (i) the name of the Tradesman; (ii) the business affiliation company name and, optionally, a company logo; (iii) a logo and printed text representing the profession of the tradesman, the logo and printed text being a member selected from a group consisting of plumbers, electricians, carpenters, masons, mechanics, repair shop professionals, contractors, or related construction or trade companies and professions and (iv) a professional license number. Upon initiation, the tradesman is provided with a list of wholesalers and jobbers that provide a discount under the Tradesman's Card Service. For each of these wholesalers, a pre-negotiated amount of discount is indicated. The back face of the Tradesman's Credit Card has a magnetic strip, which communicates the unique identification number, along with security codes representing the tradesman's profession. These magnetically stored items are read by a card reader and transmitted to the Tradesman's Card System. The system, which is a bank or a credit card issuing authority, validates the purchase and automatically applies a pre-negotiated discount for the purchase at pre-negotiated wholesalers or jobbers. However, a tradesman's purchase of goods from other merchants that are not part of the Tradesman's Card System provides no discount, and the Tradesman's Card works in a manner similar to that of a standard credit card. This Tradesman's Credit Card uniquely identifies the tradesman as a professional, not a home owner performing occasional repairs and the like and elevates the status of the tradesman by providing enhanced services and discounts at pre-negotiated wholesaler and jobber locations. The tradesman may receive periodic discounts from manufacturers, wholesalers or jobbers to support specific products or services by virtue of belonging to the Tradesman's card system.

The Tradesman's Credit Card System provides a tradesman with a credit card purchasing system and method for purchasing goods or services from a wholesaler or jobber at a specialized discount, comprising: (i) a tradesman's card that is issued to a tradesman; (ii) the card having tradesman specific information, including a license number, type of trade or profession indicated as a logo, as well as textual representation of trade, (iii) an identification number indicating that the tradesman belongs to the discount tradesman network, and (iv) the initiation date of membership while the expiration date of membership is updated within the Tradesman Card System. In a preferred embodiment, the Tradesman's Card may be issued by a credit card issuing bank wherein the identification number is the credit card number and use of the credit card generates appropriate discounts at pre-selected wholesaler or jobber locations, thereby creating a transaction that computes appropriate pre-negotiated discount levels. Since this Tradesman's Credit Card is passed through standard credit card handling machinery, the merchant is generally provided with a transaction box that is connected to the cash register machine. Upon swiping a magnetically coded tradesman's credit card, the transaction box adjusts the purchase price for good and services, as determined by the cash register machine, in accordance with pre-negotiated discount amounts and types of merchandise purchases, so that the final bill reflects these pre-negotiated discounts. The tradesman's credit card is swiped through standard credit card handling machinery. Each purchase is registered through the credit card system along with the details of merchandise for which a pre-negotiated discount is applied. The purchasing information reflects the discounts applied to purchases by the tradesman, and is available for communicating back to the wholesaler, jobber or a manufacturer that sponsors the Tradesman's Card System. The manufacturer receives updates of specific details on the purchase behavior of the tradesman in periodic intervals after payment of a fee. This allows the manufacturer to provide discounts to the tradesman for supporting the manufacturer's products, or to alter advertising strategies.

Generally stated, the invention comprises a Tradesman's Card System that includes a bank or card issuing authority capable of providing a unique service for a tradesman selected from the group consisting of plumbers, electricians, carpenters, masons, mechanics, repair shop professionals, contractors, and related construction or trade companies and professions. These tradesmen purchase substantial amounts of merchandise in the course of their work, and use for their purchase specialized wholesalers or jobbers. The bank or card issuing authority negotiates with wholesalers and jobbers for discount levels applied to tradesman trade related purchases using the Tradesman's Card System. A number of manufacturers may sponsor the Tradesman's card and may be involved in receiving on a periodic basis the details of purchases made by tradesmen in practicing their profession, thereby creating a ground level view depicting market acceptability of a manufacturer's product. The manufacturer may influence the purchases made by the tradesman for using their trade by offering a discount or incentive as well as changing the advertisements in the media to control the overall acceptance of the manufacturer's product.

When equipped with the attributes of the present invention, The Tradesman Card becomes a marketing tool for trade's people. Importantly, it identifies the user as a certified and or qualified buyer, and member of a particular field. Upon fitting the profile for the Tradesman Card, a buyer becomes eligible for the privileges of others in that field. These privileges can include special discounts, bonuses and premiums. Purchases by a cardholder are tracked by the Tradesman's Card System and provided to manufacturers or wholesalers so that other offers can be granted. Information derived from this tracking capability has significant value for manufacturers of purchased products. Consider, for example, the case of a mechanic holding a card wherein Brand M is the card sponsor, and making large volume purchases of brand G shock absorbers. In this situation, the card sponsor (Brand M) can make the cardholder a generous offer to switch brands in the future. This advantageous relationship between a card sponsor and a cardholder extends into other fields. For example, it could be used to differentiate decorators going to furniture and wall covering showrooms from persons doing their own decorating. Flower and gift shop personnel going into show rooms can be identified as true shop owners. Food and equipment wholesalers can identify and extend benefits to a true restaurateur. A carpenter from a remote location within a state that runs short of 2×4s can go to the local lumber yard that belongs to the Tradesman's card system, and be qualified to purchase at that yards wholesale prices. The carpenter is accorded a significant convenience, and the lumberyard gains an opportunity to acquire a new volume customer. A doctor on vacation needs some medical supplies can go to a medical supply store and be accorded discounts and courtesies related to their field.

Some of the larger fields for which The Tradesman Card is especially well suited include, for example: (i) within the construction field all of the special trades; (ii) agriculture, farming, landscaping, and the like; (iii) service people; janitorial, pools, specialty services such as telephone and IT.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
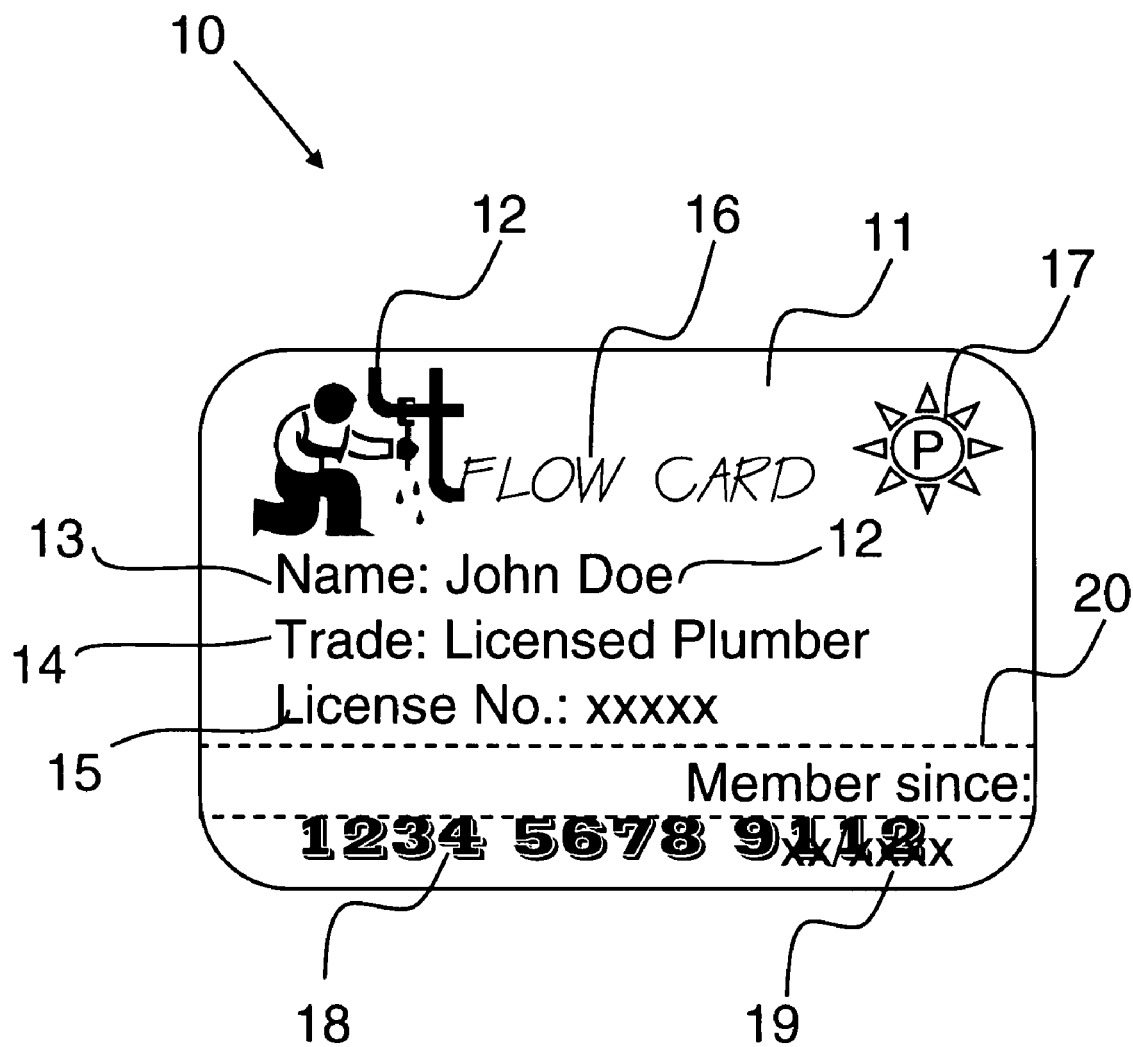
FIG. 1 is a schematic view of the front face of the Tradesman's Card.

This invention relates to a credit card system tailored for use by tradesmen. Briefly stated, the Tradesman's Credit Card is distributed solely to trade professionals selected from the group consisting of plumbers, electricians, carpenters, masons, mechanics, repair shop professionals, contractors, related construction or trade companies and professions, for purchases made at professional trade companies, including wholesalers or jobbers. The Tradesman's Card System provides a tradesman with a credit card purchasing system and method for purchasing goods or services from a wholesaler or jobber at a specialized discount. It recognizes the profession of the tradesman as being distinct from that of a home owner that engages in occasional repairs.

There are approximately two million trade companies, including plumbers, electricians, carpenters, masons, repair shops, and the like, employing approximately five million employees. Billions of sales dollars are generated by these electric, plumbing and construction related businesses and professions through the purchase of vital supplies, parts, materials, tools and services. More than five hundred thousand wholesalers or jobbers service this expanding market. With so many do-it-yourselfers, it is becoming increasingly difficult for wholesalers or jobbers to distinguish skilled trade professionals from amateurs. As a result, wholesalers or jobbers cannot immediately recognize and track purchase and spending of the professionals, and cannot offer specific purchase incentives to these large volume purchasers. Moreover, the tradesmen themselves should be recognized and distinguished from the do-it-yourselfer home repairperson to validate the importance of their craft.

The Tradesman Card readily distinguishes the professional tradesman from the do-it-yourself home repair individual. Advantageously, The Tradesman Card provides the ability for a jobber or wholesaler/supplier to immediately recognize the purchaser as a professional in the trade field. Recognition of professional tradesmen purchasers allows the jobber or wholesaler to track purchases, quantities, and the like associated with specific tradesmen and trade companies. The wholesaler or jobber can target their marketing to these specific industries and thereby provide service to expanding markets. Payment at point of purchase is also enabled through use of The Tradesman Card. This decreases overhead and rolling capital needed for the wholesalers or jobbers who traditionally extend lines of credit to individual companies. With use of The Tradesman's Card, lines of credit will be established by the credit card issuer, so that the tradesman can purchase his or her goods and the wholesaler immediately receives the payment. A tradesman using The Tradesman's Card would be nationally recognized. The tradesman would qualify for special pricing and would have his/her profession validated. Moreover, a tradesman could simply apply for and receive a single Tradesman's Credit Card from the issuer to be utilized with a variety of wholesalers so that the tradesman does not have to apply for lines or credit from each individual wholesaler. With utilization of a Tradesman's Credit Card, a tradesman's purchases would be processed in a credit card magnetic reader or an imprint machine of the type presently utilized by Visa, MasterCard, and American Express. The magnetic stripe on the back face of the Tradesman's Credit Card has encoded a unique identification number for the Tradesman's Card and a code number corresponding to the tradesman's profession. Consequently, any purchase at a predetermined wholesaler or jobber within the tradesman's profession automatically confers a pre-negotiated discount for goods and services purchased and used professionally by the tradesman.

FIG. 1 illustrates generally at 10 a schematic view of the front face of the Tradesman's Credit Card. The Tradesman's Credit Card 10 includes a credit card body 11 associated with a trade field, herein a plumber, as indicated by a mark 12, such as a symbol representing a plumber. The plumber's name is shown at 13. Additionally, a profession of the tradesman is printed at 14 and the tradesman's license number is shown at 15. The company name of the tradesman is shown at 16 and company logo is represented at 17. In this case, the company name 16 reads "Flow Card". Each tradesman is able to call the card by its own title, and/or include its own symbol, within one central service. For example, heat and air conditioning businesses might term their card "The Temperature Card", or "The Hot Card"; landscapers may call their card "The Green Card"; painters may use the name "Rainbow" or "Palette" card. A Justice card could be used by attorneys. The Tradesman's Credit Card includes a unique identification number 18, which is provided by the bank or credit card issuing authority. This unique identification number 18 constitutes a representation that the tradesman belongs to the Tradesman Card System; it also serves as a credit card number for billing purposes. The unique identification number 18 is typically embossed on the card so that the unique identification number 18 will imprint a credit card receipt. In addition to the unique, embossed identification number 18, the Tradesman's Credit Card 10 includes embossed imprintable characters identifying the name of the individual 12, the tradesman trade 13, the professional license number 15, and the name of the company 16. Optionally, the card may include the initiation date, signifying the date that the tradesman actuated, and hence became a member of, the Tradesman Card service. This date is typically indicated with the following notation: 'Member Since xx/xxxx". Identification number 18 may be encoded in a magnetic strip 20 on the back surface of the credit card body 11, which is shown in dotted lines. The magnetic coding on the magnetic strip includes both the unique identification number, additional security codes and a code representing the profession of the tradesman so that pre-negotiated discounts can be automatically generated when the Tradesman's Credit Card is used for purchase of professional merchandise at pre-selected wholesalers, or purchase of services at pre-selected jobbers. The purchase of professional merchandise by the tradesman is tracked by the bank or credit card issuing authority for assembling tradesman purchasing preferences for professional products and this assembled information may be provided to manufacturers of goods, wholesalers or jobbers. Since the tradesman is required to make periodic payment for maintenance of the Tradesman's Credit Card, the Tradesman's Card System keeps track of the credit card's expiration date, and warns the tradesman in a timely manner to make periodic payments. When the Tradesman's Credit Card is swiped in a magnetic card reader, the information is communicated to the bank or credit card issuing authority that issued the Tradesman's Credit Card. That entity either approves the sale, providing pre-negotiated discounts at pre-selected wholesalers or jobbers, or disapproves the sale.

The Tradesman Card may feature a low setup or initiation fee of $100.00 for a new jobber; a $50.00 annual fee that provides identification in a directory of suppliers issued to all card holders; and a $25.00 annual fee for a tradesman. The sponsoring manufacturers of goods, wholesalers or jobbers may pay (i) an initial fee as a part of sponsoring the Tradesman's Card System; and (ii) a further fee on a periodic basis to continue to receive reports on tradesman's professional purchases.

Utilization of The Tradesman Card provides industry recognition of trades and tradesmen, and yields clear advantageous for participating jobbers or wholesalers, manufacturers, and tradesmen. For the jobber or wholesaler, these advantageous include: (a) almost immediate cash received at point of sale; (b) freed up receivables; (c) recognition of a genuine tradesman; and (d) increased business derived from the ability to reach out to more customers without having to finance the expanded receivables. Consequently, prices can be generated in accordance with pre-negotiated discounts to a tradesman that constitutes a member selected from the group consisting of plumbers, electricians, carpenters, masons, mechanics, repair shop professionals, contractors, and related construction or trade companies and professions; such pre-negotiated discounts can be applicable to purchases made at professional trade companies, such as wholesalers or jobbers. Prime advantages to the tradesman include: (1) recognition by any participating jobber/wholesaler, as the professional would no longer be comingled with the weekend home repair amateur; (2) benefit from discounts in related industries, such as car and truck rentals, equipment leasing, and the like; and (3) benefit from direct discount of supplies from wholesaler/jobber, or from the manufacturer. The Tradesman's credit card sponsoring manufacturers of goods or wholesalers or jobbers are provided with timely information of tradesman's professional supplies buying patterns thereby providing the capability to adjust incentives, discounts delivered to a tradesman for purchases as well changing advertising practices to target a specific market segment.

The Tradesman's Card system comprises, in combination, the following salient features:

1. a Tradesman's Credit Card issued to a tradesman selected from the group consisting of plumbers, electricians, carpenters, masons, mechanics, repair shop professionals, contractors, or related construction or trade companies and professionals;
2. the Tradesman's Credit Card being issued by a bank or credit card issuing authority upon payment of an initiation fee and periodic maintenance fees;
3. the tradesman being provided with a list of wholesalers and jobbers that have agreed to provide a pre-negotiated discount for purchase of trade merchandise and services;
4. the Tradesman's Credit Card front face having printed thereon the name of the tradesman; the tradesman's business name (optionally with a business logo); a logo and printed text representing the profession of the tradesman; the tradesman's license number; and, optionally, the card's initiation date and the expiration date maintained by Tradesman's Card System, and a unique identification number which also serves as a credit card number;
5. the Tradesman's Credit Card back face having a magnetically encoded strip readable by a magnetic card reader, for transmitting the unique identification number and the tradesman's profession code;
6. use of said Tradesman's Credit Card by a tradesman for the purchase of merchandise at said wholesalers or jobbers results in automatic generation of pre-negotiated discounts for said trade purchases;
7. trade purchases by the tradesman being tracked by the bank or credit card issuing authority, and data concerning the purchases being analyzed to provide valuable marketing information for manufacturers of goods, service providers and wholesalers on a fee payment basis;

whereby the tradesman's profession is recognized by presentation of the Tradesman's Credit Card at wholesaler and jobber locations, providing discounts for trade specific goods and services purchased and used professionally by the tradesman.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A Tradesman's Credit Card System, comprising:
    a. a Tradesman's Credit Card appointed to be issued to a qualifying tradesman selected from the group consisting of plumbers, electricians, carpenters, masons, mechanics, repair shop professionals, contractors, or construction, trade companies or professionals upon payment of an initiation fee and payment of periodic maintenance fees;
    b. said Tradesman's Credit Card being appointed for issuance by a bank or credit card issuing authority;
    c. said tradesman being provided with a list of wholesalers and jobbers that have agreed to provide a pre-negotiated discount for purchase of trade merchandise and services;
    d. said Tradesman's Credit Card front face having printed thereon the name of the tradesman, the tradesman's business name, a logo and printed text representing the profession of the tradesman's business, tradesman's license number, and a unique identification number which serves as the Tradesman's Credit Card System number and also as a credit card number;

e. said Tradesman's Credit Card back face having a magnetically encoded strip readable by a magnetic card reader, for transmitting the unique identification number and the tradesman's license number;

f. said magnetic strip additionally including security codes;

g. said Tradesman's Card further including a pictorial logo representing the profession of the tradesman;

h. use of said Tradesman's Credit Card by a tradesman for the purchase of merchandise at said wholesalers or jobbers results in automatic generation of pre-negotiated discounts for said trade purchases;

i. said trade purchase by the tradesman being tracked by said bank or credit card issuing authority and purchase information being analyzed to provide valuable marketing information for manufacturers of goods, service providers and wholesalers on a fee payment basis;

j. said discount on trade purchases by the tradesman is provided by communication between a magnetic card reader device and said bank or credit card issuing authority which sets discount levels for trade merchandise at cash register checkout; and k. the qualification of a tradesman for a Tradesman's Card includes an evaluation of professional licenses and company affiliation;

whereby the tradesman's profession is recognized by presentation of the Tradesman's Credit Card at wholesaler and jobber locations, and discounts are provide for trade specific goods and services purchased and used professionally by the tradesman, and said Tradesman's Credit Card System relieves wholesalers, jobbers or other commercial organizations from opening credit lines for a tradesman in order to attract the tradesman's business purchases.

2. A Tradesman's Credit Card System as recited by claim 1, wherein said Tradesman's Card includes a pictorial logo of the business of the tradesman.

3. A Tradesman's Credit Card System as recited by claim 1, wherein said Tradesman's Credit Card System provides a tradesman with instant credit for trade specific purchases without having to open charge accounts at a plurality of wholesalers, jobbers or other commercial organizations.

4. A Tradesman's Credit Card System as recited by claim 1, wherein said Tradesman's Credit Card System is sponsored by manufacturers of goods, service providers and wholesalers upon payment of an initial sponsorship fee and periodic payment of fees for tradesman professional purchase reports.

5. A Tradesman's Credit Card System as recited by claim 4, wherein said professional purchase reports include brand specific purchase details and product details that indicate end use customer preferences.

6. A Tradesman's Credit Card System as recited by claim 4, wherein said manufacturers of goods, service providers and wholesalers establish additional discounts for tradesman professional purchases, or provide incentives.

* * * * *